Feb. 6, 1940.   V. L. RODRIGUEZ   2,189,678
NUT CRACKING, GRADING, AND KERNEL SEPARATING MACHINE
Filed July 29, 1938   5 Sheets-Sheet 1

Inventor
Vincent L. Rodriguez
Albert E. Dieterich
By   and
Theodore H. Rutley
Attorneys.

Feb. 6, 1940. V. L. RODRIGUEZ 2,189,678
NUT CRACKING, GRADING, AND KERNEL SEPARATING MACHINE
Filed July 29, 1938 5 Sheets-Sheet 3

Vincent L. Rodriguez, Inventor

Albert E. Dieterich
and
Theodore H. Rutley
Attorneys.

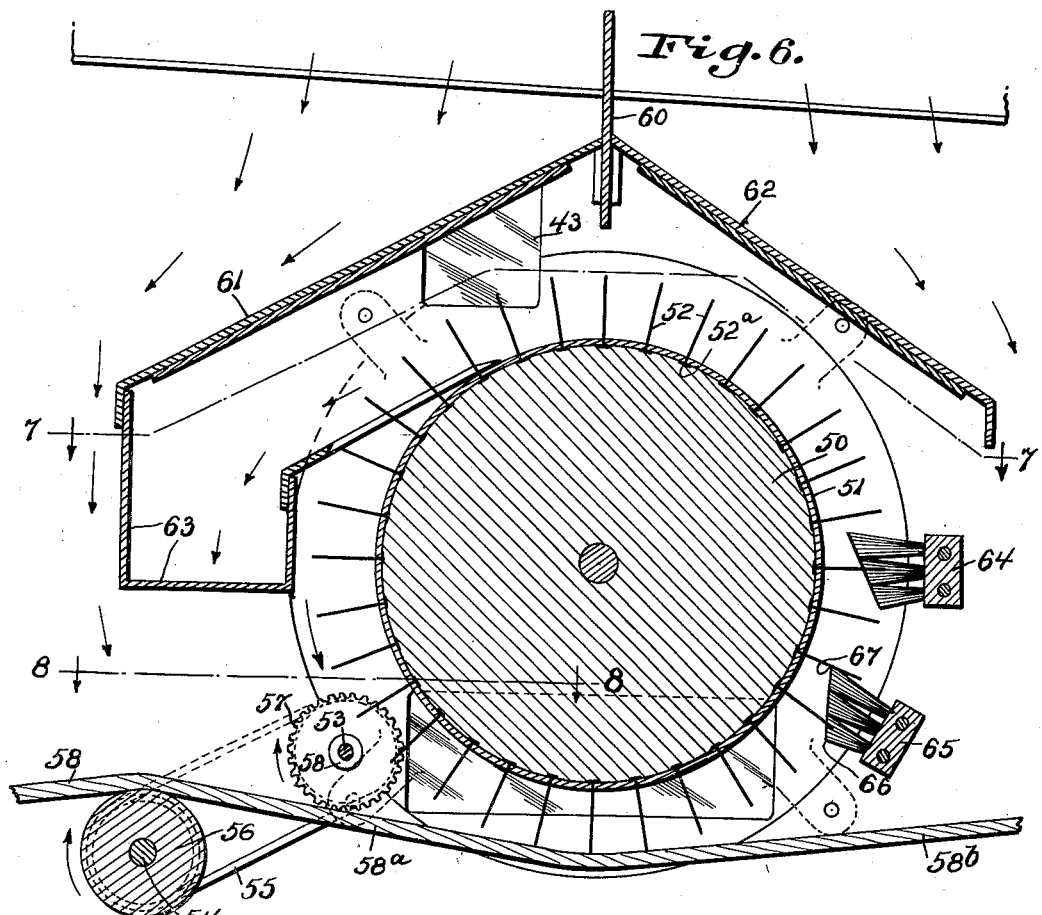
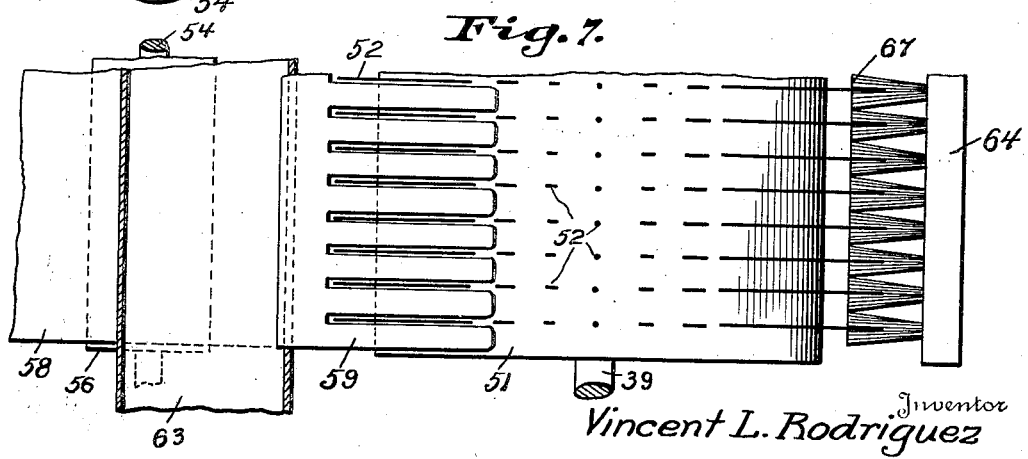

Patented Feb. 6, 1940

2,189,678

UNITED STATES PATENT OFFICE 2,189,678

NUT CRACKING, GRADING, AND KERNEL SEPARATING MACHINE

Vincent L. Rodriguez, Los Angeles, Calif.

Application July 29, 1938, Serial No. 222,022

19 Claims. (Cl. 209—109)

My invention, which relates to machines for large scale operations of removing the kernels of nuts from the shells and separating the kernels into groups or grades according to size, particularly has for its object to provide a very practical machine which, while of sufficiently rugged construction to stand up well when in use, will be economical to build and maintain in use, one which will efficiently serve the purpose for which it has been designed.

Further, it is an object of the invention to provide a machine in which the nuts are cracked and dropped into a barrel-screen which has several grades of screening, from which the cracked nuts are passed into compartments and from thence onto a travelling conveyor that carries them to the pickers, which pick up the kernels but not the shells. From the pickers the kernels are deposited into off-take chutes and discharged into receptacles provided outside the machine.

A further object is to provide an improved conveyor and picker system by virtue of which the pickers are kept free of the shells and the kernels only are removed from the picker pins by suitable combs.

Again, it is an object to provide means whereby, should a shell become wedged between the picker pins, such shell will be removed by brushes which at the same time serve to push the kernels more securely onto the pins.

Further, the invention has for an object to provide a picker with pins whose free ends are so formed that while they will enter the soft kernels and pick up the same, they will not enter and pick up the shells.

Further, it is an object to provide means at the advance side of the picker to keep the kernels and shells in line with the pickers so they do not get in between the rows of picker pins and jam in.

Other objects will in part be obvious and in part be pointed out hereinafter.

To the attainment of the above objects and ends the invention still further resides in those novel features of construction, combination and arrangement of parts, all of which will be first fully described in the detailed description and then be particularly pointed out in the appended claims, reference being had to the accompanying drawings, in which—

Fig. 6 is an enlarged detail vertical section of one of the pickers and its associated mechanism.

Fig. 7 is a detail horizontal section on line 7—7 of Fig. 6.

Figure 1:
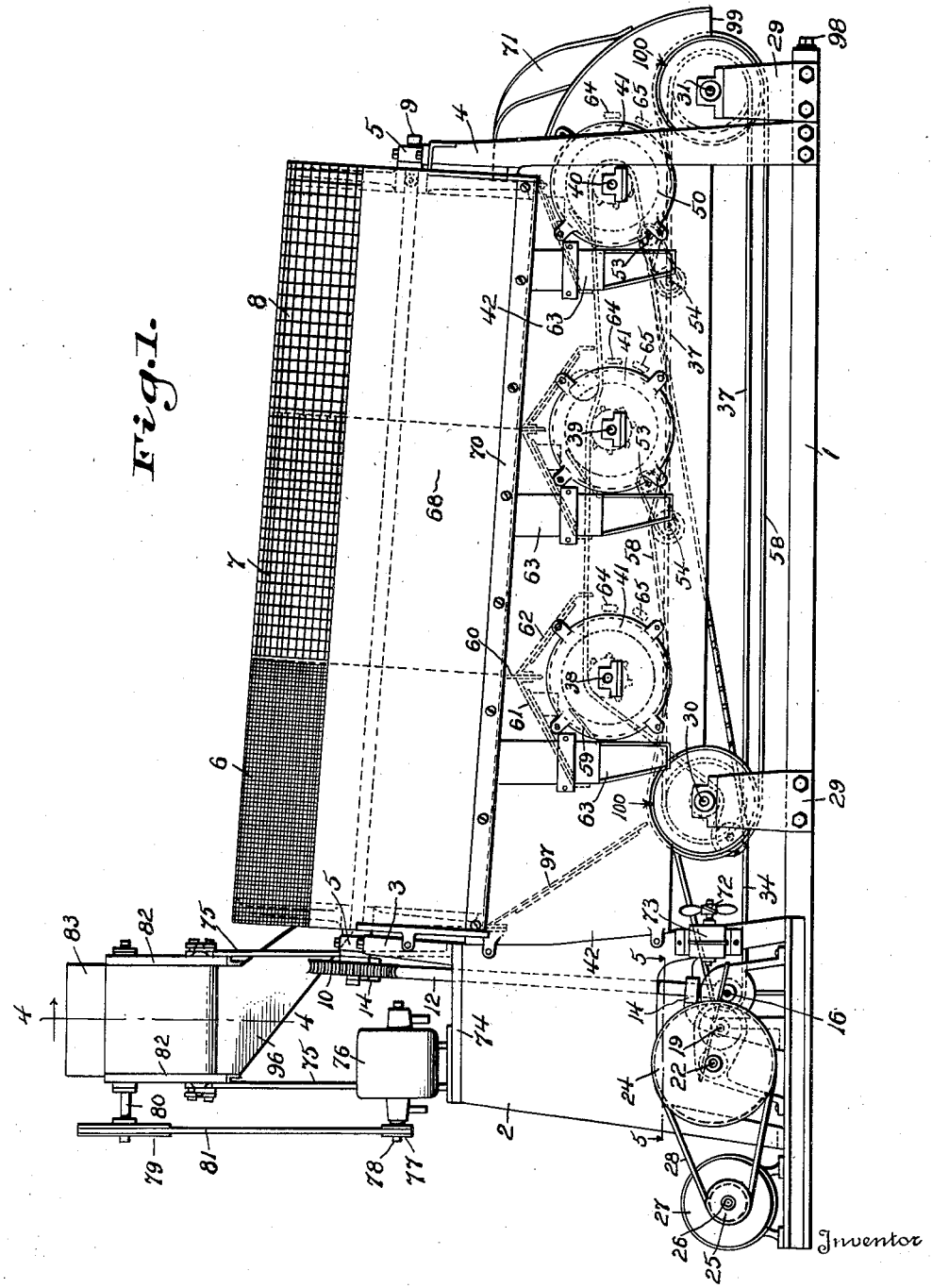
Fig. 1 is a wide elevation of the complete machine.

Referring now to the accompanying drawings, in which like numerals and letters of reference designate like parts in all the figures, I represents the bed or base of the machine. At one end there is located a standard 2 carrying a platform 14 on which is another standard 3 having a bearing 5 for the higher end of the inclined shaft 9 of the barrel-screen grader and separator. The other end of the shaft 9 is journalled in a bearing 5 on a standard 4 projecting from base 1 upwardly.

The barrel-screen is composed of several (three being shown) sections 6, 7, 8, the fine section 6 being at the high end, the coarse section 8 at the low end, and the medium section 7 in the middle.

Figure 2:
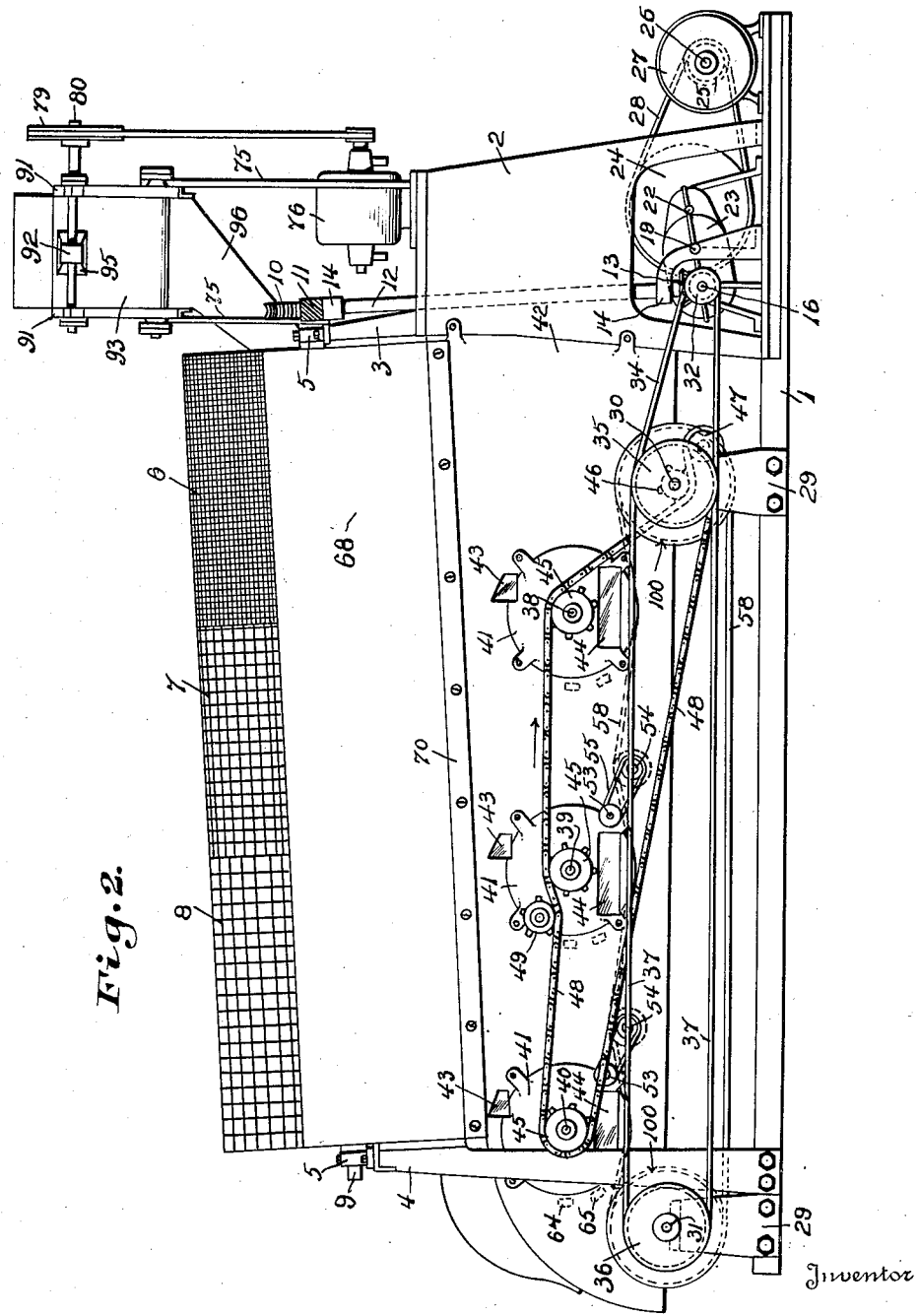
Fig. 2 is a side elevation of the same, looking at the side opposite that shown in Fig. 1.
Figure 3:
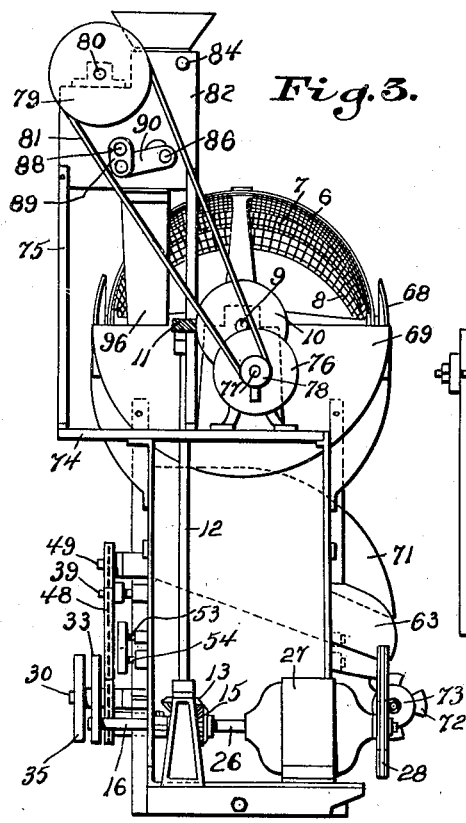
Fig. 3 is an end elevation.
Figure 4:
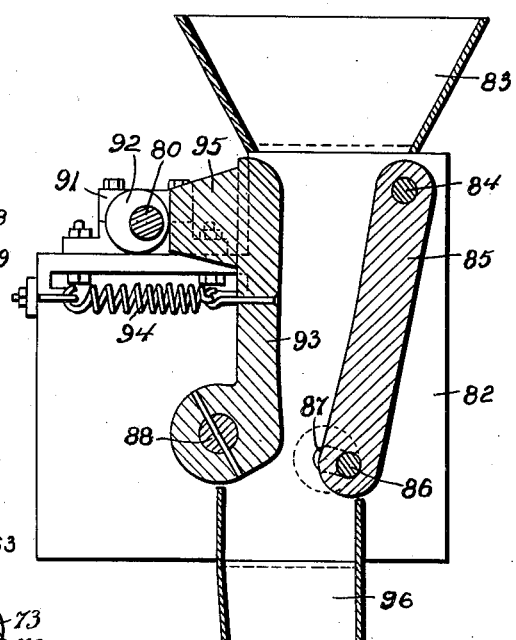
Fig. 4 is an enlarged detail section on the line 4—4 of Fig. 1.
Figure 8:
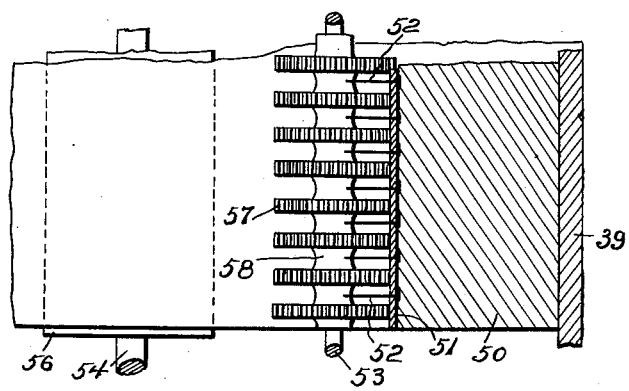
Fig. 8 is a detail horizontal section on line 8—8 of Fig. 6.
Figures 9, 10:
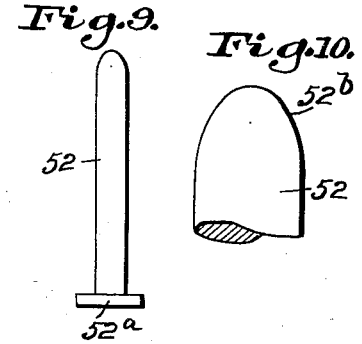
Fig. 9 is an enlarged elevational view of one of the picker pins.
Fig. 10 is a magnified view of the free end of the same.
Figure 5:
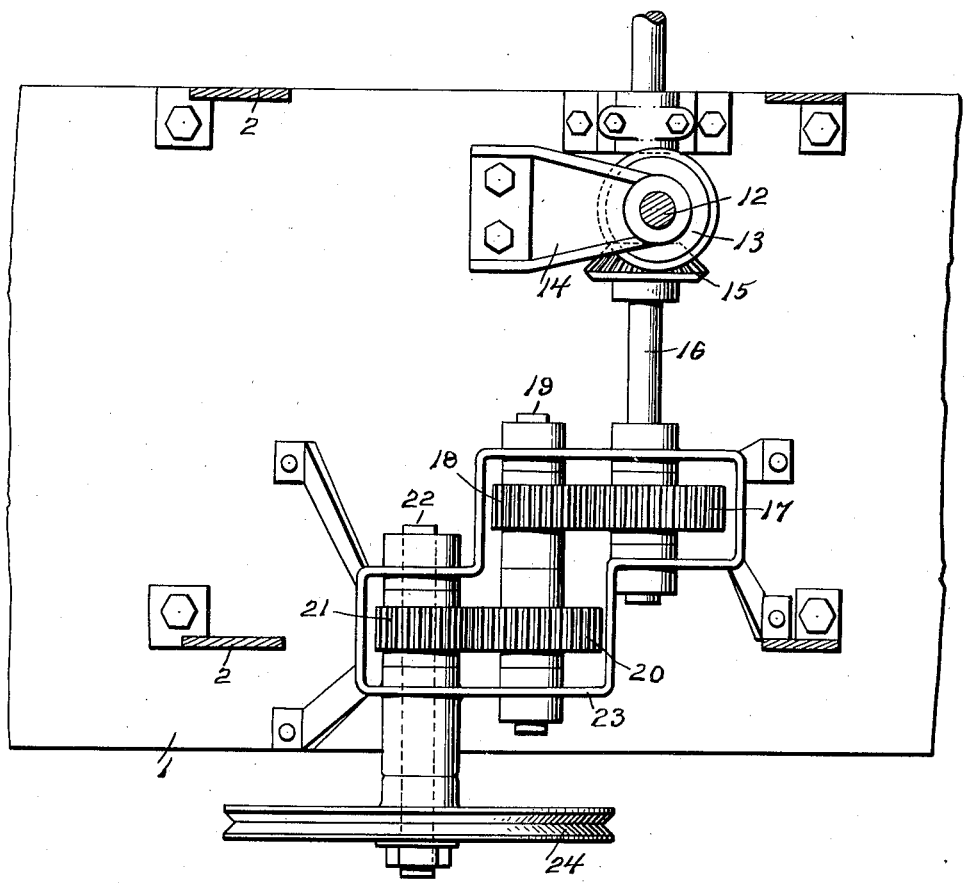
Fig. 5 is an enlarged detail section on the line 5—5 of Fig. 1.

The shaft 9 carries a worm gear 10 which meshes with the worm 11 on the worm shaft 12 which is mounted in bearings 14—14 and carries a bevel gear 13 at its lower end (see Figs. 2 and 5). The bevel gear 13 meshes with a bevel gear 15 on a shaft 16 that projects into the gear box 23 and carries a spur gear 17. The gear 17 meshes with a pinion 18 on a countershaft 19 that is journalled in bearings in box 23 and also carries a spur gear 20. The gear 20 meshes with a pinion 21 on the shaft 22 which is driven by a suitable motor 27 whose shaft 26 has a pulley 25 that drives pulley 24 on shaft 22 through a belt 28.

On each side of the machine are standards 29 which have suitable bearings in which the shafts 30 and 31 that carry the pulley 35 and 36, respectively, are journalled. The pulleys 35 and 36 are connected by a belt 37. The shaft 16 has a pulley 32 over which, and over a pulley 33 on shaft 30, a driving belt 34 passes.

Each shaft 30 and 31 carries the end pulleys 100 around which the endless conveyor belt 58 passes.

Mounted between the barrel-screen and the conveyor belt is a series of pickers. These pickers comprise shafts 38, 39 and 40, mounted in suitable bearings in the bearing carriers 41 secured to the side plates 42 one of which, at least, is provided with conveniently located transparencies forming windows 43, 44, through which the internal workings of the picker mechanism and its immediately cooperative parts may be inspected.

The shafts 38, 39 and 40 are provided with sprockets 45 over which the picker driving chain 48 passes. The shaft 30 also has a sprocket 46 under which the chain passes, an idler sprocket 47 being provided adjacent sprocket 46 around which the chain also passes (see Fig. 2). Another idler sprocket 49 insures proper contact between the chain 48 and the intermediate sprocket 45.

By referring now particularly to Figs. 6 to 10, inclusive, the construction of the pickers will be made clear. Each picker comprises a shaft on which a drum 50 is mounted. On the periphery of the drum is a band 51 through which the kernel-picking pins 52 pass, the heads 52ª of the pins lying against the drum 50. The band 51 is secured to the drum in any desired way so as to constitute a unitary structure with the same. The picker pins 52 do not have pointed ends. On the contrary, the ends are rounded and blunt as at 52ᵇ, shown in Figs. 9 and 10, so that they will not stick into and pick up shell.

All pickers, except the first, include means to prevent shell and kernels from jamming between the row of teeth on the drums. This device is not found to be necessary for the picker which deals only with the finest size of shell and kernel since the pieces are too small to clog the picker—although I wish it understood that it may be provided for the first picker also should it be found desirable in practice.

The device referred to comprises a shaft 53 journalled in suitable bearings in the side plates 42; on this shaft is a set of discs 57 which lie between the rows of pins 52 (see Fig. 8) and have their peripheries corrugated or gear-toothed. The shaft 53 is turned by being connected with a shaft 54 of a roller 56 by means of a belt and pulley connection 55. The roller 56 is turned by the conveyor belt 58 which passes over it and under the drum 50. The shaft 54 is so positioned that the belt 58 where it passes from pulley 56 to the under side of the picker and beneath the discs 57 is downwardly inclined as at 58ª, the belt being inclined upwardly as at 58ᵇ when it leaves the picker.

Each picker also includes a comb 59 which removes the kernels from the pins 52 and deflects the kernels into the off-take chute 53 by which they are directed to the outside of the machine and drop into containers (not shown) provided for the reception of the kernels.

Between each barrel-screen section and beneath the same there is located a separating-partition 60 at either side of which an inclined bottom plate 61—62 is located for deflecting falling nuts to the conveyor belt 58 beneath, the plate 61 serving also as a cover for the chute 63.

Located at the far side of the picker drum are one or more brushes 64—65 of a peculiar design. Each brush has its bristles so designed that the plane of their ends is not normal to the drum but is so inclined that the near end 66 of the plane 66—67 lies at the peripheral path traversed by the pin ends, while the remote end 67 of the plane lies about half-way between such peripheral path and the periphery of the drum 50. These brushes, while able to sweep off any shells that may lie between annular rows of pins, also serve to push the kernels farther onto the pins, and thus ensure the picker against throwing off the kernels prematurely. By this construction and arrangement of brushes the brushes do not sweep the meat off the pins but only clear out the shells which lie caught between adjacent pins.

At each side of the barrel-screen 6—7—8 are contour plates 68 and at the ends end plates 69 are provided. The plates 68 have flanges 70 by means of which they are secured to the side plates 42.

71 designates the final discharge chute through which the shells and the kernels which do not pass through the walls of sections 6—7—8 of the barrel-screen are discharged.

A fan 72 and its motor 73 are mounted on the standard 2 and directed to blow a current of air beneath the ends of the chutes 63, etc., to blow the dust and thin inner skin of the nut away from the falling meat.

By referring now to Figs. 1, 2, 3 and 4, the construction of the nut cracker will be made clear. Upon supports 75 which extend upwardly from platform 74 are side plates 82 which carry bearings 91 for a cam shaft 80. The shaft 80 is driven by a pulley 79 and belt 81 from the pulley 77 on the shaft 78 of the motor 76 that is mounted on the platform 74. A hopper 83 is mounted across from plate 82 to plate 82 and between these plates the cracking jaws 85 and 93 are mounted.

The jaw 85 is pivotally mounted at 84 and has a rod 86 at its lower end, which rod passes through slots 87 in the plate 82 and carries a link 90 that connects to an arm 89 on the rock shaft 88 on which jaw 93 is secured. The jaw 93 has a block which is held against the cam 92 by a spring 94. A chute 96 delivers the crushed nuts into the high end of the barrel-screen.

At the entrant end of the machine is a baffle-board 97 which cooperates with the adjacent inclined plate 61 to deflect the material falling from section 6 to conveyor belt 58.

Any suitable means may be provided, such as a belt tightener 98, to keep the conveyor belt and drive chain sufficiently taut and as such tighteners are well known, detailed description thereof is thought to be unnecessary.

99 indicates the end where all shells from the conveyor are discharged.

In using my machine, power from any suitable source is supplied to the motors 27, 76 and 73. The nuts are placed in hopper 83 and crushed by the jaws 85—93 as the nuts gravitate toward chute 96. The cracked nuts pass down chute 96 and are delivered into the high end of the barrel-screen. The fine particles pass through mesh 6, the next size through mesh 7, the next through mesh 8, and those left pass out over chute 71.

As the particles fall from the barrel-screen, they are deflected onto the conveyor belt 58 and are carried down beneath the picker drums, where the pins stick into the kernels and the shells are passed along.

Since the discs 57 rotate in a direction opposite to the movement of the conveyor 58, they will retard any material that would otherwise pass between the annular rows of pins and cause the material to line up with the pins, thereby ensuring efficient action of the pickers and preventing, as much as possible, shells from being caught between pins. Should any shells get caught between the pins after passing the discs 57, the brushes 64—65 will dislodge them. As the pickers rotate they carry the kernels to the combs which strip the kernels from the pins and effect their discharge from the machine via chute 63.

Attention is particularly called to the fact that the upper flight of the conveyor belt 58 is not on a level, but is curved, the picker inclining down on the near side and up on the far side of the picker drum.

From the foregoing description, taken in connection with the accompanying drawings, it is thought that the construction, operation and advantages of my invention will be clear to those skilled in the art to which it relates.

What I claim is:

1. In a machine of the class described, a base, standards on the base having bearings, a barrel-screen grader having a shaft mounted in said bearings and inclined downwardly from its entrant end to its exit end, side and end contour plates for said grader, said grader having screen-sections of progressively increasing mesh from its entrant end towards its exit end, a set of pickers beneath the grader, one for each screen-section, a belt conveyor beneath said pickers to cooperate with the same, means to incline the belt downwardly as it approaches the pickers, said pickers each including a rotating drum having radially disposed kernel-picking pins on its periphery, a comb for removing the kernels from the pins, means to deliver the kernels from the machine at each picker, and means adjacent the entrant side of a picker for keeping the material from crowding at the place where the conveyor and pins meet.

2. In a machine of the class described, a rotating picking drum having radially disposed circumferential rows of curved blunt-end picking pins, and a conveyor belt running beneath the drum in proximity to the pins thereof, in combination with rotating discs adjacent the conveyor at the ingoing side of the drum and projecting between the rows of pins, and means for operating the aforesaid drum, belt and discs.

3. In a machine of the class described, a rotating picking drum having radially disposed circumferential rows of curved blunt-end picking pins, and a conveyor belt running beneath the drum in proximity to the pins thereof, in combination with rotating discs adjacent the conveyor at the ingoing side of the drum and projecting between the rows of pins, a roller over which said belt passes, the movement of the belt serving to turn said roller, power-transmitting connections between said roller and said discs, and means to drive said belt and said drum.

4. In a machine of the class described, a rotating picking drum having radially disposed circumferential rows of curved blunt-end picking pins, and a conveyor belt running beneath the drum in proximity to the pins thereof, in combination with rotating discs adjacent the conveyor at the ingoing side of the drum and projecting between the rows of pins, means for operating the aforesaid drum, belt and discs, and at least one brush located at the far side of said drum and shaped to sweep off shells caught between the picker pins and to push the kernels on the pins towards the drum.

5. In a machine of the class described, a rotating picking drum having radially disposed circumferential rows of curved blunt-end picking pins, and a conveyor belt running beneath the drum in proximity to the pins thereof, in combination with rotating discs adjacent the conveyor at the ingoing side of the drum and projecting between the rows of pins, a roller over which said belt passes, the movement of the belt serving to turn said roller, power-transmitting connections between said roller and said discs, means to drive said belt and said drum, and at least one brush located at the far side of said drum and shaped to sweep off shells caught between the picker pins and to push the kernels on the pins towards the drum.

6. In a machine of the class described, a flexible endless-belt conveyor and means to drive the same, a plurality of pickers above and in cooperative relation to said belt, said pickers being spaced apart, means to deliver cracked nuts onto said conveyor at places in advance of each picker, said belt being inclined downwardly as it approaches each picker and then upwardly away from each picker, means to comb the kernels from the pickers and deliver the same from the machine, the shells being conveyed away by the belt conveyor and finally discharged from the machine, means for supporting and guiding said belt at two places, one before the drum and one after the drum, the places where the belt is supported being positioned above the lowermost position of the picker pins, by virtue of all of which the unsupported portion of the belt passing directly beneath the drum is urged against the drum due to the flexibility and tension of the belt and the action of the supporting and guiding means.

7. In a machine of the class described, a flexible endless-belt conveyor and means to drive the same, a plurality of pickers above and in cooperative relation to said belt, said pickers being spaced apart, means to deliver cracked nuts onto said conveyor at places in advance of each picker, said belt being inclined downwardly as it approaches each picker and then upwardly away from each picker, means to comb the kernels from the pickers and deliver the same from the machine, means to prevent material piling up on the conveyor as it reaches the pickers, means for supporting and guiding said belt at two places, one before the drum and one after the drum, the places where the belt is supported being positioned above the lowermost position of the picker pins, by virtue of all of which the unsupported portion of the belt passing directly beneath the drum is urged against the drum due to the flexibility and tension of the belt and the action of the supporting and guiding means.

8. In a machine of the class described, an endless-belt conveyor and means to drive the same, a plurality of pickers above and in cooperative relation to said belt, said pickers being spaced apart, means to deliver cracked nuts onto said conveyor at places in advance of each picker, means for inclining said belt downwardly as it approaches each picker and then upwardly away from each picker, means to comb the kernels from the pickers and deliver the same from the machine, said pickers including rotating drums having circumferential rows of radial picking pins, and means for lining up the material on the conveyor with the rows of pins as the material approaches the picker drums.

9. In a machine of the class described, an endless-belt conveyor and means to drive the same, a plurality of pickers above and in cooperative relation to said belt, said pickers being spaced apart, means to deliver cracked nuts onto said conveyor at places in advance of each picker, means for inclining said belt downwardly as it approaches each picker and then upwardly away from each picker, means to comb the kernels from the pickers and deliver the same from the machine, and sets of rotating discs cooperating with the belt and the pickers and disposed adjacent the places where the conveyor belt delivers the material to the pickers for preventing the material from piling up at those places.

10. In a machine of the class described, an endless-belt conveyor and means to drive the same, a plurality of pickers above and in cooperative relation to said belt, said pickers being spaced apart, means to deliver cracked nuts onto said conveyor at places in advance of each picker, means for inclining said belt downwardly as it approaches each picker and then upwardly away from each picker, means to comb the kernels from the pickers and deliver the same from the machine, sets of rotating discs cooperating with the belt and the pickers and disposed adjacent the places where the conveyor belt delivers the material to the pickers for preventing the material from piling up at those places, and means operated by the conveyor belt for rotating said discs in a direction opposite that in which the belt moves.

11. In a machine of the class described, an endless-belt conveyor and means to drive the same, a plurality of pickers above and in cooperative relation to said belt, said pickers being spaced apart, means to deliver cracked nuts onto said conveyor at places in advance of each picker, means for inclining said belt downwardly as it approaches each picker and then upwardly away from each picker, means to comb the kernels from the pickers and deliver the same from the machine, and sets of rotating discs cooperating with the belt and the pickers and disposed adjacent the places where the conveyor belt delivers the material to the pickers for preventing the material from piling up at those places, said discs having toothed peripheries.

12. In a machine of the class described, an endless-belt conveyor and means to drive the same, a plurality of pickers above and in cooperative relation to said belt, said pickers being spaced apart, means to deliver cracked nuts onto said conveyor at places in advance of each picker, means for inclining said belt downwardly as it approaches each picker and then upwardly away from each picker, means to comb the kernels from the pickers and deliver the same from the machine, sets of rotating discs cooperating with the belt and the pickers and disposed adjacent the places where the conveyor belt delivers the material to the pickers for preventing the material from piling up at those places, and means operated by the conveyor belt for rotating said discs in a direction opposite that in which the belt moves, said discs having toothed peripheries.

13. In a machine of the class described, an endless-belt conveyor and means to drive the same, a plurality of pickers above and in cooperative relation to said belt, said pickers being spaced apart, means to deliver cracked nuts onto said conveyor at places in advance of each picker, means for inclining said belt downwardly as it approaches each picker and then upwardly away from each picker, and means to comb the kernels from the pickers and deliver the same from the machine, said pickers each including a rotating drum having on its periphery rows of picking pins, combined with a brush the ends of whose bristles lie in a plane inclined to the periphery of the drum.

14. In a machine of the class described, an endless-belt conveyor and means to drive the same, a plurality of pickers above and in cooperative relation to said belt, said pickers being spaced apart, means to deliver cracked nuts onto said conveyor at places in advance of each picker, means for inclining said belt downwardly as it approaches each picker and then upwardly away from each picker, and means to comb the kernels from the pickers and deliver the same from the machine, said pickers each including a rotating drum having on its periphery rows of picking pins, combined with a brush the ends of whose bristles lie in a plane inclined to the periphery of the drum, the edge of the brush remote from the drum lying outside the annular path through which the ends of the pins pass while the edge of the brush nearest the drum terminates within the space between the drum and said annular path, by virtue of which the brush will sweep out material that is carried by the drum and is not impaled on the pins.

15. In a machine of the class described, an endless-belt conveyor and means to drive the same, a plurality of pickers above and in cooperative relation to said belt, said pickers being spaced apart, means to deliver cracked nuts onto said conveyor at places in advance of each picker, means for inclining said belt downwardly as it approaches each picker and then upwardly away from each picker, means to comb the kernels from the pickers and deliver the same from the machine, said pickers each including a rotating drum having on its periphery rows of picking pins, combined with a brush the ends of whose bristles lie in a plane inclined to the periphery of the drum, the edge of the brush remote from the drum lying outside the annular path through which the ends of the pins pass while the edge of the brush nearest the drum terminates within the space between the drum and said annular path, by virtue of which the brush will sweep out material that is carried by the drum and is not impaled on the pins, and means to prevent material piling up on the conveyor as it approaches the picker drums and to guide the material into alignment with the rows of pins.

16. In a machine of the character stated, a picker comprising a rotating drum having spaced rows of picking pins on its circumference, a belt conveyor for delivering material to the picker, means to prevent material piling up on the belt as it approaches the drum, and means on the far side of the drum for clearing unimpaled material from between the pins and pushing the impaled material further onto the pins.

17. In a machine of the character stated, a picker comprising a rotating drum having spaced rows of picking pins on its circumference, a belt conveyor for delivering material to the picker, means to prevent material piling up on the belt as it approaches the drum, and means on the far side of the drum for clearing unimpaled material from between the pins and pushing the impaled material further onto the pins, said preventing means comprising a shaft paralleling the axis of the drum and carrying a set of toothed discs which project between rows of teeth and whose peripheries are located in proximity to the belt conveyor, and means to turn said disc-carrying shaft.

18. In a machine of the character stated, a picker comprising a rotating drum having spaced rows of picking pins on its circumference, a belt conveyor for delivering material to the picker, means to prevent material piling up on the belt as it approaches the drum, and means on the far side of the drum for clearing unimpaled material from between the pins and pushing the impaled material further onto the pins, said clearing means comprising at least one brush the outer ends of whose bristles lie in a plane inclined to the drum in such position that one edge of the brush lies at the extreme periphery of the drum and its pins while the other edge lies within the path of the bristles for purposes specified.

19. In a machine of the character described, a rotating picker drum having rows of picking pins on its circumference, a material conveyor-belt running beneath said drum and engaged by the pins thereof, means to elevate said belt to provide an upwardly inclined portion and a downwardly inclined portion at the approach side of the drum, the downwardly inclined portion being adjacent the drum, means to deliver material onto said belt on the upwardly inclined portion, and means cooperating with said downwardly inclined portion and with the rows of picker pins for preventing material being piled up and getting between the pins at the approach side of the drum.

VINCENT L. RODRIGUEZ.